UNITED STATES PATENT OFFICE.

HENRY BLUMENBERG, JR., OF NEW YORK, N. Y.

BATTERY COMPOUND.

SPECIFICATION forming part of Letters Patent No. 638,039, dated November 28, 1899.

Application filed April 7, 1899. Serial No. 712,045. (No specimens.)

*To all whom it may concern:*

Be it known that I, HENRY BLUMENBERG, Jr., a citizen of the United States, residing at New York city, (Wakefield,) in the borough of Bronx, State of New York, have invented an Improvement in Battery Compounds, of which the following is a specification.

My invention relates to an improvement in compounds for battery solutions and to that class of solutions containing ammonium chlorid. This material is at the present time extensively used for open-circuit cells. With this material objections or difficulties arise because detrimental incrustations are frequently formed of oxychlorid of zinc on both the carbon and zinc poles, thereby increasing the internal resistance and eventually making the cell practically useless. I have found that this difficulty can be prevented to a greater or less extent by adding to the ammonium chlorid a solution of a salt containing sulfuric acid, and the advantage of this improvement can be easily seen in keeping the electrodes practically free from such coating or incrustation. The salt containing sulfuric acid that I prefer to employ is aluminium tersulfate. The exact proportions do not need to be specified, as the results in testing the battery as made up will determine the quantity employed. The aluminium salt added should only be to the extent of the solubility of ammonia-alum which is formed when the aluminium sulfate is added to the chlorid of ammonium. I do not restrict myself to the sulfate of aluminium in a pure and simple condition, as I am well aware that the alums may in some cases replace it. The sulfuric acid radical is in excess and tends to keep the electrodes clear and free from incrustation. The materials will usually be mixed dry in the proper proportions, so as to simply require the addition of water.

I claim as my invention—

A battery compound of ammonium chlorid and aluminium tersulfate, substantially as set forth.

Signed by me this 4th day of April, 1899.

HENRY BLUMENBERG, JR.

Witnesses:
GEO. T. PINCKNEY,
S. T. HAVILAND.